United States Patent
Grossi

[15] 3,695,605
[45] Oct. 3, 1972

[54] RADIUS ROD FOR VEHICLE AXLE

[72] Inventor: Antonio Grossi, 18025 Albion Ave., Detroit, Mich. 48234

[22] Filed: June 11, 1971

[21] Appl. No.: 152,335

[52] U.S. Cl. ..................................................267/66
[51] Int. Cl. ....................................................B60g 1/00
[58] Field of Search........................267/66, 67, 68

[56] References Cited

UNITED STATES PATENTS 1,643,970  10/1927  Wilkins.....................269/66
2,099,817  11/1937  Mahana.....................267/66

*Primary Examiner*—James B. Marbert
*Attorney*—Barnes, Kisselle, Raisch & Choate

[57] ABSTRACT

A radius rod for a vehicle axle comprising two links arranged in overlapping relation with interengaged teeth on their confronting faces. The links are adapted to be clamped together and a gear is mounted on one of the links meshing with a gear rack portion on the other link for adjusting the length of the radius rod.

10 Claims, 5 Drawing Figures

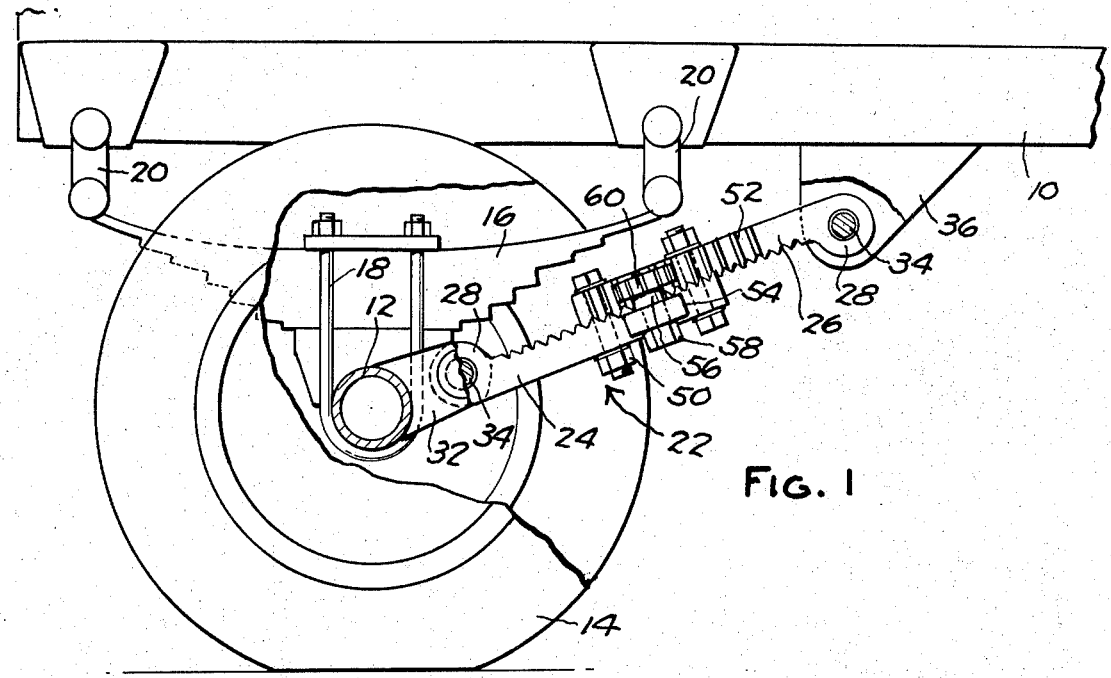
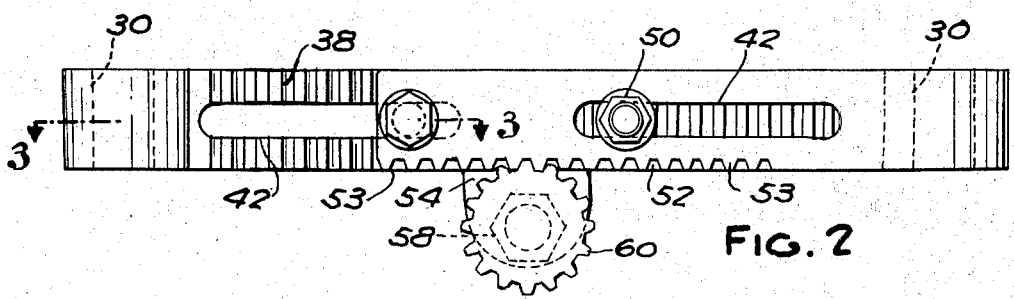
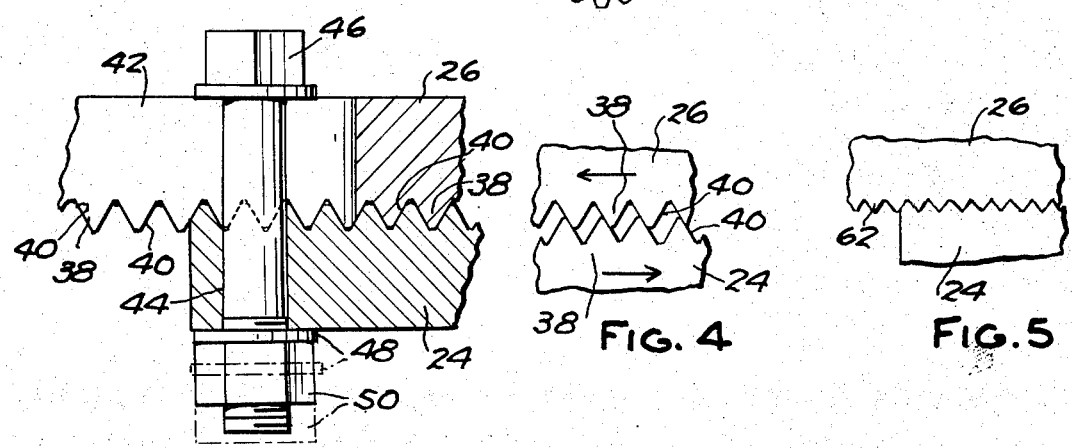
INVENTOR
ANTONIO GROSSI
BY
Barnes, Kisselle, Raisch & Choate
ATTORNEYS

RADIUS ROD FOR VEHICLE AXLE

This invention relates to an adjustable radius rod for a vehicle axle.

The axles of many vehicles, highway trailers for example, are interconnected with the frame of the vehicle by a pair of radius rods which permit the axle to be adjusted to and maintained in a position perpendicular to the longitudinal axis of the vehicle. One conventional form of such radius rods comprises a threaded sleeve encircling a threaded shaft, the sleeve and shaft being connected to the axle and vehicle frame so that as the shaft is threaded into and out of the sleeve the radius rod is retracted or extended in length to shift the portion of the axle to which the radius rod is connected lengthwise of the vehicle. Radius rods of this type consisting of two members threaded together are frequently very difficult to adjust in length because the parts thereof frequently, because of rust or other reasons, become so rigidly connected or stuck together that it is difficult to rotate one relative to the other.

The present invention has for its object the provision of a radius rod for vehicle axles adapted to retain its adjusted length through extended periods of use while at the same time adapted to be adjusted easily.

Other features and objects of the invention will become apparent from the following description and drawings, in which:

FIG. 1 is a fragmentary view, with parts broken away, of a vehicle trailer provided with a radius rod of the present invention;

FIG. 2 is a view of the radius rod itself;

FIG. 3 is a sectional view along the line 3—3 in FIG. 2;

FIG. 4 is a fragmentary view showing the action of the two links forming the radius rod when being extended or contracted;

FIG. 5 is a fragmentary view of a modified form of radius rod according to the present invention.

In FIG. 1 there is illustrated a portion of a vehicle in which the vehicle frame is designated 10. The wheel axle 12 on which the wheels 14 are supported is connected to a leaf spring assembly 16 by means of U bolts 18. Spring assembly 16 is in turn connected to vehicle frame 10 by means of shackles 20.

The radius rod of the present invention is generally designated 22 and consists essentially of two links 24,26 which are clamped together by means hereinafter described. Each link has an enlarged end 28 with a through bore 30 for mounting the radius rod on the vehicle. Enlarged end 28 of link 24 is connected to a bracket 32 on axle 12 by means of a pin and bushing assembly 34 and the enlarged end 28 of link 26 is connected to a bracket 36 on vehicle frame 10 by means of a similar pin and bushing assembly 34. Two such radius rods would be used for each axle.

As shown in the drawings, links 24,26 have confronting faces which overlap one another and which are formed with teeth 38. Teeth 38 are preferably triangularly shaped so as to have inclined side faces 40 which interengage when the two links are clamped together. Each of the two links are formed with through slots 42 which extend lengthwise of each link and which open through the faces thereof provided with teeth 38. Each link is also provided with a through bore 44 adjacent the end thereof opposite the enlarged end 28. Bores 44 are located beyond the slots 42 in the links and are aligned therewith to receive a screw extending through the slot 42 in the opposed link (FIG. 3). A lock washer 48 and nut 50 are provided for the threaded end of screws 46. When the two links are arranged in overlapped relation as shown in the drawing and nuts 50 are tightened on screws 46, the teeth 38 on the two links are brought into tight interengagement so as to retain the links in fixed position relative to one another and thus fix the length of the radius rod.

It will be appreciated that the length of the radius rod can be incrementally increased or decreased by loosening nuts 50, separating the two links to disengage teeth 38, thereafter shifting the two links axially relative to one another to the desired extend and finally again tightening nuts 50 to clamp the two links together.

The radius rod of the present invention provides a means for easily adjusting the length of the radius rod. To facilitate such length adjustment link 26 is formed on a face thereof perpendicular to the face on which teeth 38 are formed with a gear rack portion 52. The teeth 53 of rack portion 52 are straight and extend in a direction perpendicular to the longitudinal axis of link 26. A pillow block member 54 is mounted on the adjacent face of link 24. Within pillow block member 54 there is journalled a stub shaft 56 having a hex head abutment 58 at one end and a gear 60 fixed to its opposite end. Gear 60 has its teeth meshing with the teeth of gear rack 52.

With the radius rod in the assembled condition shown in FIGS. 1 and 2 if it is desired to adjust the length thereof to shift the portion of the axle to which the radius rod is connected either forwardly or rearwardly, nuts 50 are first loosened sufficiently to enable the two links 24,26 to be separated sufficiently as to disengage the teeth 38 thereon. Thereafter a wrench is applied to the hex head 58 at the outer end of stub shaft 56 so as to rotate the shaft and thereby rotate gear 60. If the two links 24,26 are stuck together, the torque on gear 60 will be sufficient to break them apart. This results from the fact that teeth 38 have inclined side faces and when a force is applied to link 26 tending to shift it lengthwise relative to link 24 (FIG. 4) the inclined faces 40 of teeth 38 act to produce a component of force tending to separate the two links. This is made possible by the fact that teeth 53 on rack portion 52 remain engaged with gear 60. It will be appreciated that gear 60 with its stub shaft 56 need not be permanently mounted on the radius rod assembly. Gear 60 can be in the nature of a single removable tool adapted for adjusting numerous such radius rods.

The size of teeth 38 determines the minimum incremental adjustment that can be obtained with the radius rod. Thus, as shown in FIG. 5, teeth 62 on links 24,26 are substantially smaller than teeth 38 and, thus, permit a much finer adjustment of the length of the radius rod than is obtainable with teeth 38.

I claim:

1. A radius rod for a vehicle axle comprising a pair of links having confronting faces which overlap in a direction axially of the links, one end of one link having means thereon for connection with the vehicle frame and the opposite end of the other link having means thereon for connection to the axle, said confronting faces each having a plurality of closely spaced teeth thereon extending transversely to the axis of the link such that the radius rod is adjustable incrementally in length by interengaging a greater or lesser number of teeth on one link with the teeth on the other link, means for clamping the links together with said teeth interengaged, one of said links having a gear rack portion thereon extending lengthwise of the link means on the other link for supporting a gear in mesh with said gear rack whereby, when said clamping means are released, the gear is adapted to be rotated to displace said links axially relative to one another to thereby adjust the length of the radius rod.

2. A radius rod as called for in claim 1 wherein said teeth are generally triangularly shaped in cross section such that upon rotation of the gear the inclination of the interengaged teeth produces a force tending to both separate the links and to shift them axially relative to each other.

3. A radius rod as called for in claim 1 wherein the side faces of each tooth are oppositely inclined at an acute angle to the face of the link on which they are disposed such that upon rotation of said gear a force is produced which tends to both separate the links and displace them axially relative to one another.

4. A radius rod as called for in claim 1 wherein each link has an axially extending slot therethrough aligned with the slot in the other link, said clamping means extending through said slots.

5. A radius rod as called for in claim 4 wherein said clamping means comprises a stud in each link extending through the slot in the other link and means on said studs for displacing the tooth surfaces of the links toward each other to interengage said teeth.

6. A radius rod as called for in claim 5 wherein said studs comprise screws and said last-mentioned means comprise nuts threaded on the screws.

7. A radius rod as called for in claim 1 wherein said means for supporting said gear comprises a bracket on the other link and including a shaft rotatably supported by said bracket and a gear fixed to said shaft and engaging said gear rack portion, said shaft having means thereon adapted for engagement with a tool for rotating the gear.

8. A radius rod as called for in claim 7 wherein said last-mentioned means comprises a non-circular abutment at one end of the shaft.

9. A radius rod as called for in claim 8 wherein said shaft extends through said bracket with said gear on one side thereof and said non-circular abutment on the opposite side thereof.

10. A radius rod as called for in claim 1 wherein said gear rack portion is disposed in a plane generally perpendicular to said interengaged teeth and the teeth of the gear rack portion extend perpendicular to the axes of said links.

* * * * *